US012568235B2

(12) United States Patent
Zhu et al.

(10) Patent No.: US 12,568,235 B2
(45) Date of Patent: Mar. 3, 2026

(54) MULTIMEDIA RESOURCE PROCESSING METHOD AND APPARATUS, ELECTRONIC DEVICE, AND READABLE STORAGE MEDIUM

(71) Applicant: Beijing Zitiao Network Technology Co., Ltd., Beijing (CN)

(72) Inventors: Yaguang Zhu, Beijing (CN); Bing Yan, Beijing (CN); Xigui Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 105 days.

(21) Appl. No.: 18/571,859

(22) PCT Filed: Aug. 16, 2022

(86) PCT No.: PCT/CN2022/112890
§ 371 (c)(1),
(2) Date: Dec. 19, 2023

(87) PCT Pub. No.: WO2023/029986
PCT Pub. Date: Mar. 9, 2023

(65) Prior Publication Data
US 2024/0298019 A1     Sep. 5, 2024

(30) Foreign Application Priority Data

Sep. 6, 2021     (CN) .......................... 202111036753.4

(51) Int. Cl.
| | |
|---|---|
| *H04N 19/40* | (2014.01) |
| *H04N 21/258* | (2011.01) |
| *H04N 21/2743* | (2011.01) |

(52) U.S. Cl.
CPC ........... *H04N 19/40* (2014.11); *H04N 21/258* (2013.01); *H04N 21/2743* (2013.01)

(58) Field of Classification Search
CPC .. H04N 19/40; H04N 21/258; H04N 21/2743; H04N 21/2343
(Continued)

(56) References Cited

U.S. PATENT DOCUMENTS

| | | | | |
|---|---|---|---|---|
| 9,510,033 B1 * | 11/2016 | Corley | ............... | H04N 21/2343 |
| 10,191,954 B1 * | 1/2019 | Corley | .................. | G06F 16/258 |

(Continued)

FOREIGN PATENT DOCUMENTS

| | | |
|---|---|---|
| CN | 101909048 A | 12/2010 |
| CN | 104967868 A | 10/2015 |

(Continued)

OTHER PUBLICATIONS

ISA China National Intellectual Property Administration, International Search Report and Written Opinion Issued in Application No. PCT/CN2022/112890, Nov. 17, 2022, WIPO, 10 pages.

*Primary Examiner* — Tung T Vo
(74) *Attorney, Agent, or Firm* — Alleman Hall LLP

(57)     ABSTRACT

Provided in the embodiments of the present disclosure are a multimedia resource processing method and apparatus, and an electronic device and a readable storage medium. On the basis of a contribution feature, the number of future visits of a multimedia resource uploaded by a contribution user can be predicted; a transcoding priority is obtained on the basis of the number of future visits of the multimedia resource; and the multimedia resource with a high transcoding priority is preferentially transcoded.

18 Claims, 5 Drawing Sheets

(58) Field of Classification Search
USPC ...................................................... 375/240.1
See application file for complete search history.

(56) References Cited

U.S. PATENT DOCUMENTS

| | | | | |
|---|---|---|---|---|
| 10,757,360 | B1 * | 8/2020 | Breitman | H04N 7/01 |
| 11,184,650 | B1 * | 11/2021 | Muthiah | H04N 21/234309 |
| 11,722,710 | B1 * | 8/2023 | Vegas | H04N 21/234309 |
| | | | | 725/116 |
| 11,765,418 | B1 * | 9/2023 | Sendurpandian | A63F 13/352 |
| | | | | 725/116 |
| 12,230,024 | B2 * | 2/2025 | Wang | G06V 10/993 |
| 2005/0198290 | A1 * | 9/2005 | Berkey | H04L 67/1089 |
| | | | | 709/225 |
| 2007/0153916 | A1 * | 7/2007 | Demircin | H04N 21/2365 |
| | | | | 375/240.26 |
| 2012/0030376 | A1 * | 2/2012 | Lemus | H04L 67/565 |
| | | | | 709/246 |
| 2014/0140417 | A1 * | 5/2014 | Shaffer | H04N 21/23608 |
| | | | | 375/240.28 |
| 2014/0294085 | A1 * | 10/2014 | Layachi | H04N 19/513 |
| | | | | 375/240.16 |
| 2015/0009403 | A1 * | 1/2015 | Li | H04N 21/2343 |
| | | | | 348/441 |
| 2015/0146794 | A1 * | 5/2015 | Hoang | H04N 19/91 |
| | | | | 375/240.24 |
| 2017/0026311 | A1 * | 1/2017 | Wang | H04L 47/83 |
| 2017/0094290 | A1 * | 3/2017 | Yuen | H04N 19/436 |
| 2018/0295372 | A1 * | 10/2018 | Jiang | H04N 19/40 |
| 2018/0302660 | A1 * | 10/2018 | Olechowski | H04L 65/80 |
| 2020/0029086 | A1 * | 1/2020 | Zou | H04N 19/436 |
| 2020/0195934 | A1 * | 6/2020 | Xing | G06V 20/49 |
| 2023/0104270 | A1 * | 4/2023 | Wang | H04N 19/154 |
| | | | | 375/240.03 |
| 2023/0308694 | A1 * | 9/2023 | Vegas | H04N 19/164 |

FOREIGN PATENT DOCUMENTS

| | | |
|---|---|---|
| CN | 111565316 A | 8/2020 |
| CN | 112565775 A | 3/2021 |

\* cited by examiner

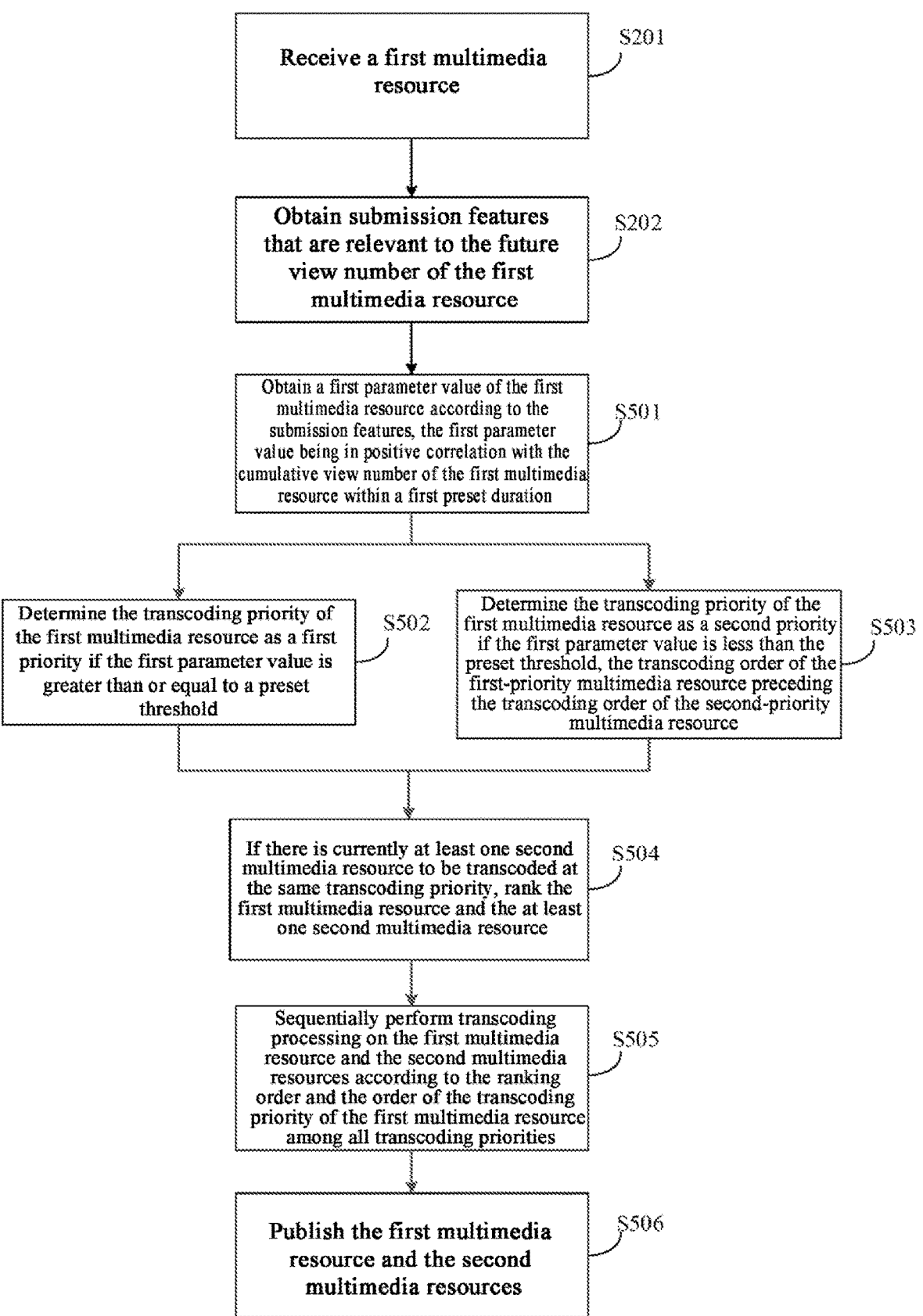

Receive a first multimedia resource — S201

Obtain submission features that are relevant to the future view number of the first multimedia resource — S202

Obtain a first parameter value of the first multimedia resource according to the submission features, the first parameter value being in positive correlation with the cumulative view number of the first multimedia resource within a first preset duration — S501

Determine the transcoding priority of the first multimedia resource as a first priority if the first parameter value is greater than or equal to a preset threshold — S502

Determine the transcoding priority of the first multimedia resource as a second priority if the first parameter value is less than the preset threshold, the transcoding order of the first-priority multimedia resource preceding the transcoding order of the second-priority multimedia resource — S503

If there is currently at least one second multimedia resource to be transcoded at the same transcoding priority, rank the first multimedia resource and the at least one second multimedia resource — S504

Sequentially perform transcoding processing on the first multimedia resource and the second multimedia resources according to the ranking order and the order of the transcoding priority of the first multimedia resource among all transcoding priorities — S505

Publish the first multimedia resource and the second multimedia resources — S506

MULTIMEDIA RESOURCE PROCESSING METHOD AND APPARATUS, ELECTRONIC DEVICE, AND READABLE STORAGE MEDIUM

CROSS-REFERENCE TO RELATED APPLICATION(S)

The application is a national stage application filed under 35 U.S.C. 371 based on International Patent Application No. PCT/CN2022/112890, filed Aug. 16, 2022, which claims the priority of Chinese Patent Application No. "202111036753.4", filed with China National Intellectual Property Administration on Sep. 6, 2021 and entitled "MULTIMEDIA RESOURCE PROCESSING METHOD AND APPARATUS, ELECTRONIC DEVICE, AND READABLESTORAGE MEDIUM", the disclosures of which are incorporated in its entirety herein by reference.

FIELD

Embodiments of the disclosure relate to the field of data processing technology, and in particular to a multimedia resource processing method and apparatus, an electronic device, and a readable storage medium.

BACKGROUND

With the development of terminal technology, short videos have become an important means for users to obtain information. More and more users are accustomed to recording and sharing their lives through methods such as taking photos and recording short videos.

Currently, submission users can upload recorded videos to a server. The server performs video transcoding to form different formats, thereby adapting to different terminals. Users who want to watch the videos can request the videos from the server using their own terminals. The server can deliver the transcoded videos adapted to the terminals to the terminals, allowing the users who want to watch the videos to watch the videos recorded by the submission users.

Due to the large quantity of videos uploaded by the users to the server, the server is required to transcode the videos based on the priority of the videos, thereby improving transcoding processing on the videos with high quality.

SUMMARY

Embodiments of the disclosure provide a multimedia resource processing method and apparatus, an electronic device, and a readable storage medium, thereby improving transcoding specificity and precision.

In a first aspect, an embodiment of the disclosure provides a multimedia resource processing method, including:

receiving a first multimedia resource; obtaining submission features, which are relevant to the future view number of the first multimedia resource; obtaining a transcoding priority of the first multimedia resource according to the submission features, the transcoding priority being in positive correlation with the order of transcoding the first multimedia resource among all multimedia resources to be transcoded; transcoding, according to the transcoding priority of the first multimedia resource, the first multimedia resource before publishing, so as to obtain at least two versions of the first multimedia resource, the different versions of the first multimedia resource being different in encoding format; and publishing the at least two versions of the first multimedia resource.

In a second aspect, an embodiment of the disclosure provides a multimedia resource processing apparatus, including:

a transceiver module for receiving a first multimedia resource; a processing module, configured to obtain submission features, and obtain a transcoding priority of the first multimedia resource according to the submission features, the submission features being relevant to the future view number of the first multimedia resource, and the transcoding priority being in positive correlation with the order of transcoding the first multimedia resource among all multimedia resources to be transcoded; a transcoding module, configured to perform, according to the transcoding priority of the first multimedia resource, transcoding processing on the first multimedia resource before publishing, so as to obtain at least two versions of the first multimedia resource, the different versions of the first multimedia resource being different in encoding format; and a publishing module, configured to publish the at least two versions of the first multimedia resource.

In a third aspect, an embodiment of the disclosure provides an electronic device, including a processor and a memory. The memory stores computer executable instructions. The processor executes the computer executable instructions stored on the memory, such that the processor performs the multimedia resource processing method according to the first aspect and various possible designs in the first aspect.

In a fourth aspect, an embodiment of the disclosure provides a computer-readable storage medium. The computer-readable storage medium stores computer executable instructions. When a processor executes the computer executable instructions, the multimedia resource processing method according to the first aspect and various possible designs in the first aspect is implemented.

In a fifth aspect, an embodiment of the disclosure provides a computer program product, including computer instructions. The computer instructions, when executed by a processor, implement the multimedia resource processing method according to the first aspect and various possible designs in the first aspect.

In a sixth aspect, an embodiment of the disclosure provides a computer program. The computer program, when executed by a processor, implements the multimedia resource processing method according to the first aspect and various possible designs in the first aspect.

BRIEF DESCRIPTION OF THE DRAWINGS

In order to describe the technical solutions in embodiments of the disclosure or the related art more clearly, the accompanying drawings required for describing the embodiments or the related art will be briefly introduced below. Apparently, the accompanying drawings described below are some embodiments of the disclosure, and a person of ordinary skill in the art can also derive other accompanying drawings from these accompanying drawings without creative efforts.

FIG. 5 is a second schematic flowchart of a multimedia resource processing method according to an embodiment of the disclosure;

DETAILED DESCRIPTION OF EMBODIMENTS

In order to have a clearer understanding of the objectives, technical solutions and advantages of embodiments of the disclosure, the technical solutions in the embodiments of the disclosure are clearly and completely described in conjunction with the accompanying drawings in the embodiments of the disclosure, and it is apparent that the described embodiments are only a part rather all of embodiments of the disclosure. Based on the embodiments of the disclosure, all other embodiments obtained by those of ordinary skill in the art without contributing creative work shall fall within the scope of protection of the disclosure.

Definition of Terms in the Disclosure

Multimedia resources: images, videos, audio, files, etc.

Multimedia resource transcoding: exemplarily, for videos, transcoding refers to the process of converting the videos uploaded by users into formats. Exemplarily, for images, transcoding refers to the process of converting the images uploaded by the users into formats. Embodiments of the disclosure do not limit the formats of multimedia resource transcoding. It should be understood that in the following embodiments, a multimedia resource processing method in this application is described with multimedia resources being videos as an example.

Figure 1:
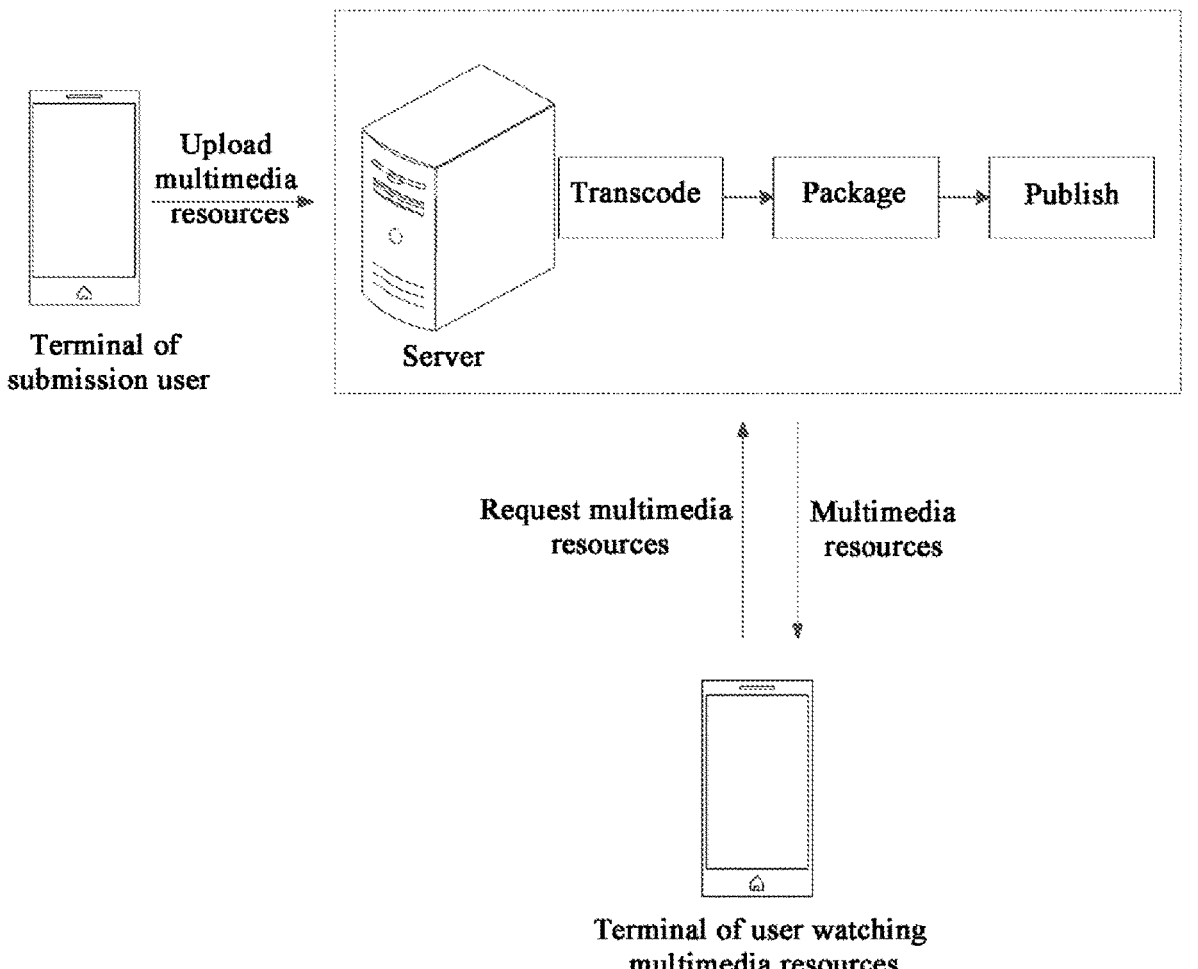
FIG. 1 is a schematic diagram of a scenario according to an embodiment of the disclosure.

FIG. 1 is a schematic diagram of a scenario according to an embodiment of the disclosure. Referring to FIG. 1, the scenario includes: a terminal of a submission user, a server, and a terminal of a user watching multimedia resources. It should be understood that the submission user refers to a user uploading multimedia resources. The submission user may upload, by the terminal, the multimedia resources to the server, where the terminal of the submission user may send the multimedia resources of the submission user to the server. The server may publish the multimedia resources after performing processing such as transcoding and packaging on the multimedia resources. The server publishing the multimedia resources means that the user who wants to watch the multimedia resources may request, by the terminal, the multimedia resources from the server, such that the user who wants to watch the multimedia resources can watch the multimedia resources on the terminal.

There are a large quantity of multimedia resources uploaded by the submission user to the server, resulting in a significant workload for server transcoding, packaging, etc. The process of transcoding by the server requires a large quantity of resources of a central processing unit (CPU) and resources of a graphics processing unit (GPU), and due to limited transcoding resources on the server, when there are a large quantity of multimedia resources to be transcoded, the server needs to decide which multimedia resources need to be prioritized for transcoding and which multimedia resources can be transcoded later. The larger the volume of submissions, the more important it becomes for the server to make prioritized transcoding decisions.

Currently, the server can prioritize the transcoding and packaging of multimedia resources uploaded by high-profile users, and this method is referred to as "VIP transcoding". The high-profile users refer to users with a fan base of over 50 thousands, or users whose multimedia resources have the view number (VV) of more than 20 thousands. However, due to the current method of adopting one-size-fits-all VIP transcoding, many other high-quality multimedia resources may be omitted, and as a result, these high-quality multimedia resources experience a delay in transcoding, making the users unable to watch the multimedia resources in time.

In order to solve the above technical problems in the related arts, this embodiment of the disclosure provides the following solution: the server may predict the future view number of the multimedia resources uploaded by the submission user, and performs, based on the future view number of the multimedia resources, prioritized transcoding on the multimedia resources with the high view number. This embodiment of the disclosure does not adopt a fixed parameter (e.g., the number of fans or the view number of the multimedia resources in the related arts) for transcoding the multimedia resources, but predicts, based on submission features, the future view number of the multimedia resources uploaded by the submission user, and therefore, the multimedia resources (e.g., multimedia resources uploaded by a submission user with a small number of fans) with a high quality cannot be omitted, thereby allowing other users to watch the multimedia resources with the high future view in time, and improving transcoding specificity and precision so as to improve user experience.

It should be understood that the multimedia resource processing method provided in this embodiment of the disclosure can be applied not only in the process of transcoding the multimedia resources but also in the scenario of multimedia resource packaging or other scenarios where there is a large volume of multimedia resources that prioritized transcoding. In the scenario of multimedia resource packaging, transcoding in the following embodiment may be replaced with packaging for the implementation.

In an embodiment, the terminal of the submission user may be a wireless terminal or a wired terminal. The wireless terminal may refer to a handheld device with a wireless connection function or other processing devices connected to a wireless modem. The wireless terminal may communicate with one or more core network devices through a radio access network (RAN). The wireless terminal may be a mobile terminal, such as a mobile phone (also known as a "cellular" phone) and a computer with a mobile terminal, which may be portable, pocket-sized, handheld, in-computer, or in-vehicle mobile devices that exchange languages and/or data with the radio access network. For another example, the wireless terminal may also be a personal communication service (PCS) phone, a cordless telephone, a session initiation protocol (SIP) phone, a wireless local loop (WLL) station, a personal digital assistant (PDA), etc. The wireless terminal may also be referred to as a system, a subscriber unit, a subscriber station, a mobile station, a mobile, a remote station, a remote terminal, an access terminal, a user terminal, a user agent, and a user device or user equipment, which is not limited herein. Optionally, the above terminal may also be a smart watch, a tablet, a wearable device, etc. This embodiment of the disclosure does not limit the terminal of the submission user. In the following embodiment, the terminal of the submission user being a mobile phone is adopted as an example for the description.

The server may be a single server or a cluster of a plurality of servers. In FIG. 1, the server being a single server is adopted for the exemplary description.

Figure 2:
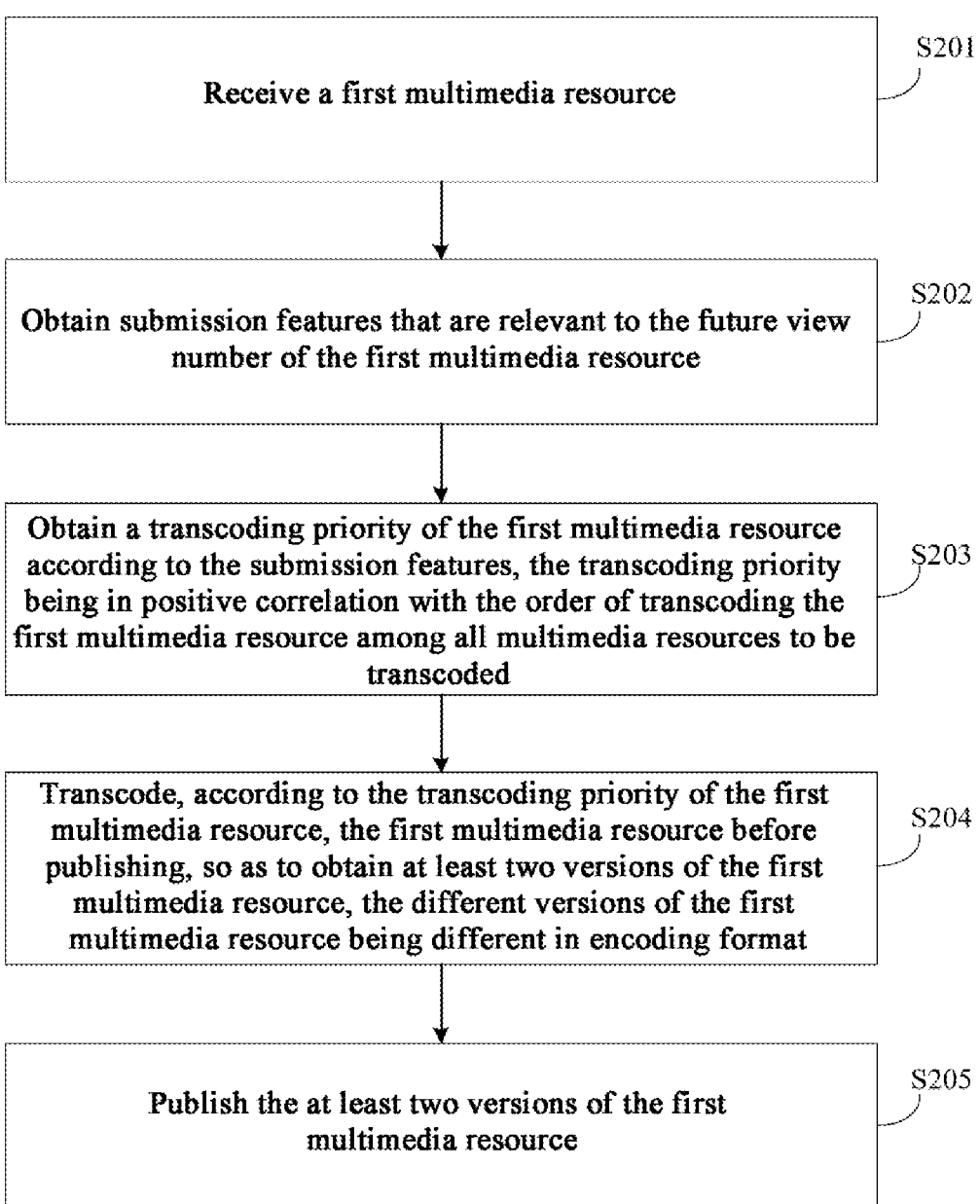
FIG. 2 is a first schematic flowchart of a multimedia resource processing method according to an embodiment of the disclosure.

Referring to FIG. 2, FIG. 2 is a first schematic flowchart of a multimedia resource processing method according to an embodiment of the disclosure. The method in this embodiment may be applied to the server in FIG. 1. The multimedia resource processing method includes:

S201: a first multimedia resource is received.

In an embodiment, when a submission user uploads the first multimedia resource on a terminal, the terminal may send the first multimedia resource uploaded by the user to the server, and correspondingly, the server may receive the first multimedia resource uploaded by the user through the terminal. In an embodiment, a device for sending the first multimedia resource to the server may also be a multimedia resource storage device. The multimedia resource storage device may store a plurality of multimedia resources, and send the multimedia resources to the server in batch, such that the server performs transcoding processing on the batched multimedia resources. In this embodiment, there may be at least one first multimedia resource. In the following embodiment, the description is made with an example that the submission user uploads the first multimedia resource on the terminal of the submission user.

Figure 3:
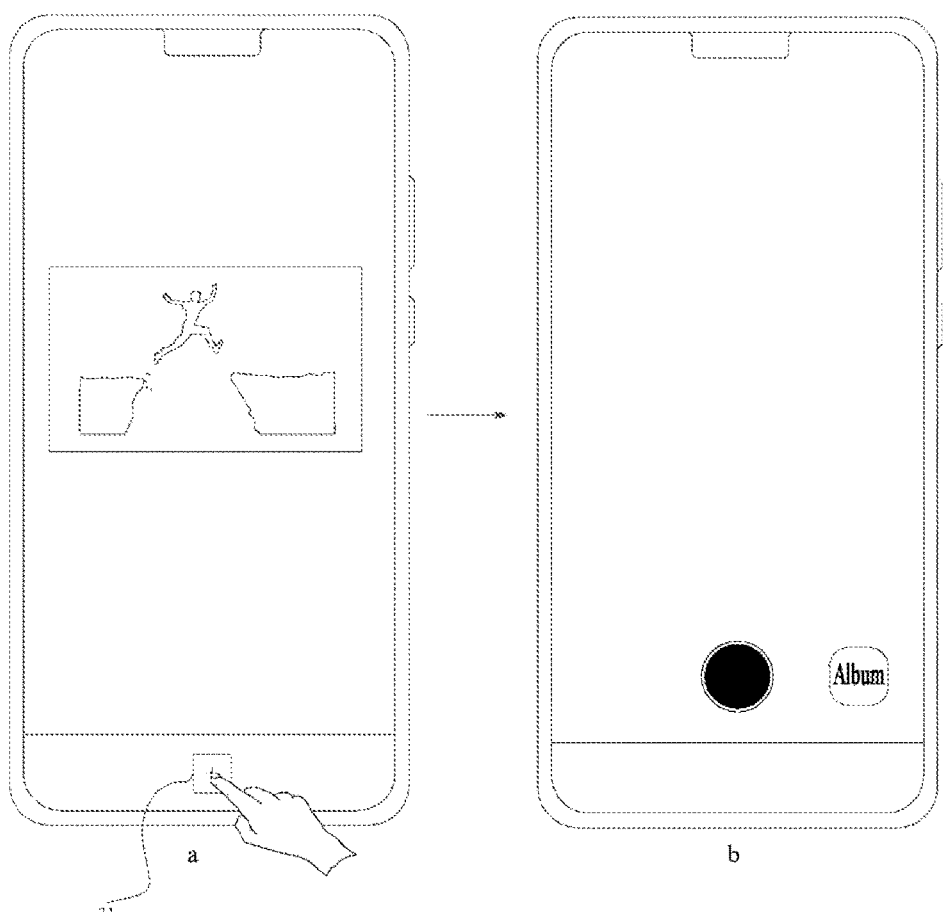
FIG. 3 is a schematic diagram of uploading a first multimedia resource by a submission user according to an embodiment of the disclosure.

FIG. 3 is a schematic diagram of uploading a first multimedia resource by a submission user according to an embodiment of the disclosure. Exemplarily, referring to FIG. 3, the figure "a" in FIG. 3 illustrates a main interface of a short video social application. The main interface includes an upload control 31. A user operates the upload control 31, which can trigger a terminal to display an interface for uploading multimedia resources. Referring to the figure "b" in FIG. 3, the user may select multimedia resources to be uploaded within the terminal, or acquire multimedia resources by shooting. Exemplarily, if the user selects a video A stored locally on the terminal, the video A may be understood as the first multimedia resource. It should be understood that after the user selects the video A, the terminal may send the video A to the server so as to upload the video A to the server. It should be understood that in the process of uploading the multimedia resource A by the terminal, the interface of the terminal may display prompt information such as uploading in progress, and a successful upload represents that the terminal successfully publishes the video A.

In an embodiment, in the process that the user selects the video A and the terminal successfully publishes the video A, the server may perform S201 to S205, such that the terminal can successfully publish the video A. In an embodiment, after the terminal uploads the video A to the server, the server may perform S201 to S205, such that the terminal can successfully publish the video A. In other words, in this embodiment of the disclosure, the server may perform, in response to the first multimedia resource received from the terminal, S202 to S205.

S202: submission features are obtained, which are relevant to the future view number of the first multimedia resource.

The submission features may include: submission features of a submission user and/or features of the first multimedia resource.

In an embodiment, when the submission features include the submission features of the submission user, the submission features include but not limited to: the number of users following the submission user, the cumulative view number on the multimedia resources of the submission user, the number of submissions, etc. The number of users following the submission user may be understood as the number of fans the submission user has, and the cumulative view number on the multimedia resources of the submission user may be understood as the sum of the view number of all submissions of the submission user.

The submission features of the submission user are relevant to the future view number of the first multimedia resource. Exemplarily, the submission features of the submission user are in positive correlation with the future view number of the first multimedia resource. When the submission user has more followers, the future view number of the first multimedia resource is higher. When the cumulative view number of the multimedia resources of the submission user is higher, the future view number of the first multimedia resource is higher. When the number of submissions is larger, the future view number of the first multimedia resource is higher.

In an embodiment, the submission features of the submission user may store information of a plurality of users. The information of the users may include the identifier of the user, the number of users following the submission user, the cumulative view number of the multimedia resources of the submission user, the number of submissions, the submission time of the user, multimedia resources, etc. The identifier of the user may be a user account, or a registered mobile phone number, or the like.

In this embodiment, the server may acquire, based on the submission user corresponding to the terminal sending the first multimedia resource and the user information stored in the server, information of the submission user. Then, the server may acquire the submission features of the submission user from the information of the submission user. It should be understood that the type of the submission features may be preset. Exemplarily, the server may adopt the number of users following the submission user, the cumulative view number of the multimedia resources of the submission user, and the number of submissions as the submission features of the submission user.

In an embodiment, the information of the users may be stored in a database. The server may acquire the information or the submission features of the submission user from the database.

In an embodiment, when the submission features include submission features of the first multimedia resource, the submission features include but not limited to: the type, the size, etc. of the first multimedia resource. Exemplarily, the first multimedia resource may be of a video type, an image type, a text type, etc. The submission features are in positive correlation with the future view number of the first multimedia resource. For example, the future view number of the video-type first multimedia resource is higher than that of the text-type first multimedia resource.

S203: a transcoding priority of the first multimedia resource is obtained according to the submission features, and the transcoding priority is in positive correlation with the order of transcoding the first multimedia resource among all multimedia resources to be transcoded.

The transcoding priority is in positive correlation with the order of transcoding the first multimedia resource among all the multimedia resources to be transcoded. In other words, the higher the transcoding priority of the first multimedia resource is, the more highly the first multimedia resource ranks in the order of transcoding all multimedia resources to be transcoded. Exemplarily, if the transcoding priority of the first multimedia resource is the highest, the first multimedia resource ranks first in the order of transcoding all multimedia resources to be transcoded.

All the multimedia resources to be transcoded may be multimedia resources uploaded by all submission users that the server receives within a preset time period. For example, the preset time period may be 1 min.

In an embodiment, the server stores a mapping relationship between the submission features and transcoding priorities, and the server may acquire, based on the submission features and the mapping relationship, the transcoding priority of the first multimedia resource. Exemplarily, the mapping relationship between the submission features and the transcoding priority may be represented by formulas, tables, etc., which is not limited in this embodiment of the disclosure.

In an embodiment, at the same transcoding priority, there is at least one multimedia resource. Exemplarily, when there is one multimedia resource at the same transcoding priority, that is, all the multimedia resources to be transcoded are different in transcoding priority, correspondingly, the server may transcode, according to the transcoding priority of each multimedia resource, all the multimedia resources to be transcoded one by one. Exemplarily, when there are at least two multimedia resources at the same transcoding priority, the multimedia resources at the same transcoding priority may be referred to as a batch of multimedia resources.

S204: according to the transcoding priority of the first multimedia resource, the first multimedia resource is transcoded before publishing, so as to obtain at least two versions of the first multimedia resource, and the different versions of the first multimedia resource are different in encoding format.

The publishing represents that the server performs processing such as transcoding and packaging on the first multimedia resource, and the first multimedia resource can be acquired by the terminal and watched by the user. Transcoding processing may be understood as the server converting the multimedia resources into multiple versions of multimedia resources with different encoding formats.

The server may perform, according to the transcoding priority of the first multimedia resource, transcoding processing on the first multimedia resource before publishing. Specifically, the server may perform transcoding processing on the first multimedia resource before publishing according to the priorities of all the multimedia resources to be transcoded and the order of the priority of the first multimedia resource among all the multimedia resources to be transcoded. Exemplarily, if the priority of the first multimedia resource ranks first among all the multimedia resources to be transcoded, the server first performs transcoding processing on the first multimedia resource. Exemplarily, if the priority of a batch of multimedia resources including the first multimedia resource ranks first among all the multimedia resources to be transcoded, the server first performs transcoding processing on this batch of multimedia resources.

The transcoding processing on the first multimedia resource by the server may be understood as converting the first multimedia resource into different encoding formats, thereby obtaining at least two versions of the first multimedia resource. Different versions of the first multimedia resource have different encoding formats. Exemplarily, if the first multimedia resource is a video, the server may convert the first multimedia resource into a first version and a second version.

It should be understood that the server converts the first multimedia resource into multimedia resources with different encoding formats in order to adapt to different models of terminals. The different models of terminals may support decoding of the multimedia resources with the corresponding encoding formats, then, the server converts the first multimedia resource into multimedia resources with different encoding formats, and therefore the different terminals can obtain and decode the first multimedia resource, and the users can watch the first multimedia resource on the terminals.

S205: the at least two versions of the first multimedia resource are published.

After the server obtains the at least two versions of the first multimedia resource, the at least two versions of the first multimedia resource can be published, which may be understood as the server successfully converting the first multimedia resource into the at least two versions of multimedia resources for the users to download and watch.

The multimedia resource processing method provided in this embodiment of the disclosure includes: the first multimedia resource is received; the submission features are obtained, which are relevant to the future view number of the first multimedia resource; the transcoding priority of the first multimedia resource is obtained according to the submission features, and the transcoding priority is in positive correlation with the order of transcoding the first multimedia resource among all the multimedia resources to be transcoded; according to the transcoding priority of the first multimedia resource, the first multimedia resource is transcoded before publishing, so as to obtain the at least two versions of the first multimedia resource, and the different versions of the first multimedia resource are different in encoding format; and the at least two versions of the first multimedia resource are published. In this embodiment of the disclosure, the server may predict, based on the submission features, the future view number of the multimedia resources uploaded by the submission user, obtains the transcoding priority based on the future view number of the multimedia resources, and performs prioritized transcoding on the multimedia resource with the high transcoding priority. This embodiment of the disclosure does not adopt a fixed parameter (e.g., the number of fans or the view number of the multimedia resources in the related arts) for transcoding the multimedia resources, but predicts, based on the submission features, the future view number of the multimedia resources uploaded by the submission user and the transcoding priority, and therefore, the multimedia resources (e.g., the multimedia resources uploaded by the submission user with a small number of fans) with a high quality cannot be omitted, thereby allowing other users to watch the multimedia resources with the high future view in time, and improving targeted transcoding and transcoding precision so as to improve user experience.

In an embodiment, in order to improve the accuracy of obtaining the transcoding priority of the first multimedia resource based on the submission features, in this embodiment of the disclosure, the server may prestore a priority model. The priority model may be obtained by a training device based on training data, and is pre-installed in the server. The training device may be a server or another electronic device, such as a computer. The training data may include multimedia resources from test users with different submission features, and scores or values labeled for the multimedia resources. The scores (values) are in positive correlation with the transcoding priority of the multimedia resources. In the following embodiment, the description is made by an example of the scores. In an embodiment, the training device may input the training data into an initial network model for training, and the priority model is obtained through machine learning.

In an embodiment, submission features in the training data may include submission features of test users. The submission features may be historical submission features of the test users. The submission features of the test users may include features of historically-cumulative submissions of the test users, and submission features of the test users within a historical second preset duration. For example, the second preset duration is 7 days. Exemplarily, the features of the test users may be shown in the following Table 1. It should be understood that in Table 1, the second preset duration being 7 days is adopted as an example for the description.

TABLE 1

| Code snippets of submission features of test users | Explanations of submission features | Sample data |
|---|---|---|
| fans_num_all | Total number of users following test users | 124 |
| item_vv_all | Cumulative view number | 22432 |
| no_fw_ad_publish_cnt_all | Cumulative number of original multimedia resources submitted by test users | 52 |
| publish_cnt_all | Cumulative number of submissions | 52 |
| item_comment_cnt_all | Cumulative number of comments on all multimedia resources | 193 |
| item_vv | Cumulative view number of all multimedia resources of test users within 7 days. | 918 |
| no_fw_ad_publish_cnt | Cumulative number of original multimedia resources submitted within 7 days | 2 |
| new_item_vv | Cumulative view number of multimedia resources submitted within 7 days | 396 |
| fans_num | Number of new users following test users within 7 days | 10 |
| publish_video_cnt | Cumulative number of submissions within 7 days | 2 |

In an embodiment, the initial network model may include but not limited to convolutional neural networks (CNNs), a recurrent neural network (RNN), a long-short-term memory (LSTM), GoogleNet, a tree model, etc. The tree model may be a single decision tree or an ensemble tree, which is not limited in this embodiment of the disclosure.

In the following embodiment, the process of training by the training device to obtain the priority model is described by an example of the initial network model being the tree model. In this embodiment of the disclosure, the tree model is, for example, a gradient boosting decision tree (GBDT) model built on the basis of a light gradient boosting machine (light GBM).

In an embodiment, the GBDT model includes 100 trees. The initial split gain of a leaf node of each tree may be a preset value. In the training process, the training device may input the training data into the first tree. The first tree may iterate through the 10 submission features in Table 1 to determine the submission features corresponding to each leaf and find a leaf with the maximum split gain, then the leaf is split, and this process is cyclically performed. In this embodiment of the disclosure, the process of performing leaf splitting on each tree is not repeatedly described, and reference may be made to relevant descriptions of the GBDT model in the related arts. It should be understood that this embodiment of this application does not limit the number of trees included in the GBDT model.

The first tree may output, based on the training data, a cross entropy loss (CEL). It should be understood that the cross entropy loss is used for representing the similarity between the score predicted by the training device using the GBDT model and the score labeled by the training data. A smaller cross entropy loss represents a higher similarity, and also represents that the score predicted by the training device using the GBDT model is closer to the score labeled by the training data. Exemplarily, if the score labeled by the training data is 90, a smaller cross entropy loss represents that the score predicted by the training device using the GBDT model is closer to 90.

Exemplarily, the training device may update the initial split gain of leaf nodes of the second tree according to the cross entropy loss of the first tree. That is, the training device may determine, according to the cross entropy loss of the first tree, an error between the similarity between the score predicted by the GBDT model and the score labeled by the training data and 100%, and then updates, according to the error, the initial split gain of the leaf nodes of the second tree.

In a similar way, the training device may continue to update the initial split gain of leaf nodes of the third tree based on the cross entropy loss of the second tree. This process continues iteratively till the 100th tree, the training device inputs the training data into the 100th tree and performs training to obtain the priority model (GBDT model) in this embodiment of the disclosure. It should be understood that the above description of the training process of the GBDT model is a simplified example, and for the detailed process, reference may be made to the existing relevant description of the GBDT model.

Figure 4:
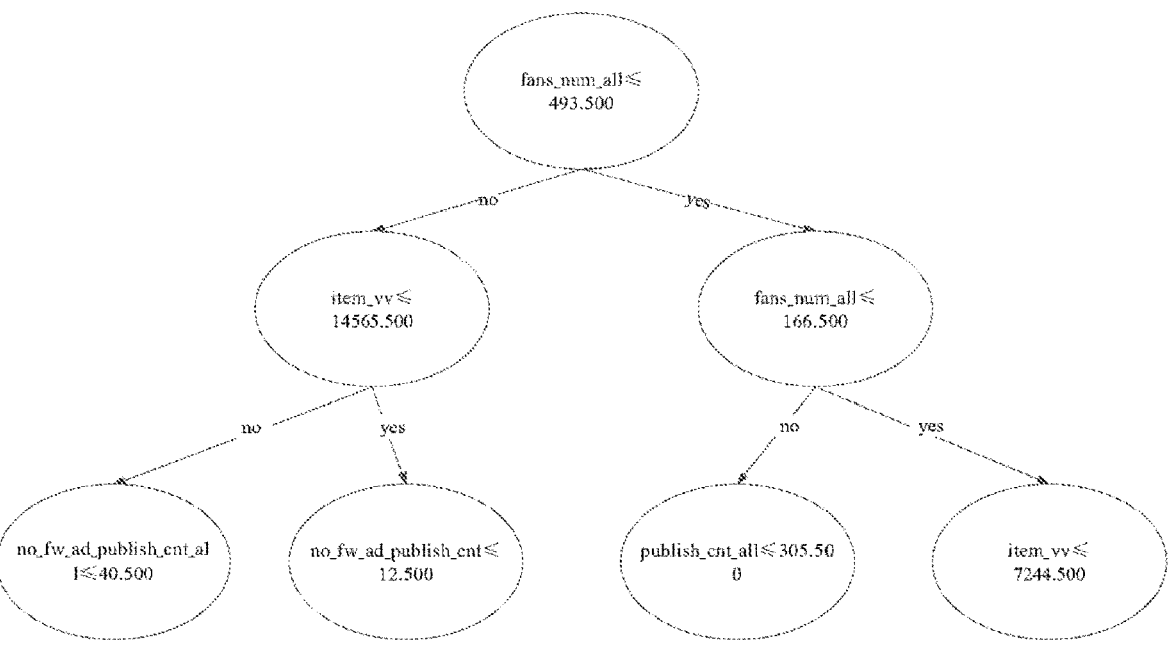
FIG. 4 is a schematic diagram of first three layers of an arbitrary tree in a GBDT model trained according to an embodiment of the disclosure.

Exemplarily, referring to FIG. 4, FIG. 4 is a schematic diagram of first three layers of an arbitrary tree in a GBDT model trained according to an embodiment of the disclosure.

In this embodiment, the multimedia resource processing method in FIG. 2 may be replaced with a multimedia resource processing method shown in FIG. 5. FIG. 5 is a second schematic flowchart of a multimedia resource processing method according to an embodiment of the disclosure. Referring to FIG. 5, S203 may be replaced with S501 to S503, and S204 may be replaced with S504 to S505.

S501: according to submission features, a first parameter value of a first multimedia resource is obtained, and the first parameter value is in positive correlation with the cumulative view number of the first multimedia resource within a first preset duration.

It should be understood that the submission features in this embodiment of the disclosure are submission features of a submission user. The server may input the submission features of the submission user into a pre-trained priority model to obtain the first parameter value of the first multimedia resource. The first parameter value is in positive correlation with the cumulative view number of the first multimedia resource within the first preset duration. The cumulative view number of the first multimedia resource within the first preset duration is in positive correlation with the transcoding priority of the first multimedia resource. Exemplarily, the first parameter value may be the score of the first multimedia resource. It should be understood that the priority model may be obtained after training based on the above initial network model. It should be understood that in an embodiment, the first preset duration may be the first preset duration after the user uploads the first multimedia resource, namely, the future first preset duration. That is, the first parameter value is in positive correlation with the cumulative view number of the first multimedia resource within the future first preset duration.

In an embodiment, because the GBDT model is adopted in this embodiment of the disclosure, the server may input the submission features into a pre-trained gradient boosting decision tree model to obtain the first parameter value of the first multimedia resource. The gradient boosting decision tree model is obtained after training based on submission features of different users, and reference may be made to the above relevant descriptions.

It should be noted that the features of the submission user in this embodiment of the disclosure may include: the submission features of the submission user, and the submission features of the submission user may be historical submission features of the submission user.

In an embodiment, the submission features of the submission user may include at least one of the following: the total number of users following the submission user, the cumulative view number of multimedia resources of the submission user, the cumulative number of submissions of the submission user, the cumulative number of original multimedia resources submitted by the submission user, and the cumulative number of comments on all the multimedia resources of the submission user.

In order to ensure the accuracy of the obtained submission features of the submission user, in an embodiment, the submission features of the submission user further include: submission features of the submission user within a historical second preset duration. For example, the second preset duration may be previous 7 days.

The cumulative submission features of the submission user within the second preset duration include one of the following: the number of new users following the submission user within the second preset duration, the cumulative view number of all the multimedia resources of the submission user within the second preset duration, the cumulative view number of the multimedia resources submitted by the submission user within the second preset duration, the cumulative number of submissions of the submission user within the second preset duration, and the cumulative number of original multimedia resources submitted by the submission user within the second preset duration.

It should be noted that the submission features of the submission user are the same as the submission features of the test users in type. For example, the submission features of the test users include: the number of new users following the test users within the second preset duration and the cumulative view number of all the multimedia resources of the test users within the second preset duration. Correspondingly, the submission features of the submission user include: the number of new users following the submission user within the second preset duration and the cumulative view number of all the multimedia resources of the submission user within the second preset duration.

S502: if the first parameter value is greater than or equal to a preset threshold, the transcoding priority of the first multimedia resource is determined as a first priority.

The preset threshold is preset, such as 1000. If the first parameter value of the first multimedia resource is greater than or equal to the preset threshold, the server determines the transcoding priority of the first multimedia resource as the first priority.

S503: if the first parameter value is less than the preset threshold, the transcoding priority of the first multimedia resource is determined as a second priority, where the transcoding order of the first-priority multimedia resource precedes the transcoding order of the second-priority multimedia resource.

If the first parameter value is less than the preset threshold, the server may determine the transcoding priority of the first multimedia resource as the second priority. The transcoding order of the first-priority multimedia resource precedes the transcoding order of the second-priority multimedia resource.

That is, in this embodiment of the disclosure, the transcoding priorities may be divided into the first priority and the second priority, and the first priority represents prioritized transcoding. At the first priority, there are at least two multimedia resources, and at the second priority, there may be at least two multimedia resources. In an embodiment, the multimedia resources at the first priority may be referred to as a first batch of multimedia resources to be transcoded, and the multimedia resources at the second priority may be referred to as a second batch of multimedia resources to be transcoded.

Therefore, in this embodiment of the disclosure, the server may determine, based on the first parameter value of the first multimedia resource, whether the first multimedia resource is at the first priority or the second priority. Correspondingly, the server may determine, based on parameter values of all the multimedia resources to be transcoded, whether each multimedia resource to be transcoded is at the first priority or the second priority.

S504: if there is currently at least one second multimedia resource to be transcoded at the same transcoding priority, the first multimedia resource and the at least one second multimedia resource are ranked.

Because the transcoding priorities may be divided into the first priority and the second priority in this embodiment of the disclosure, each priority may correspond to at least one multimedia resource. In an embodiment, the server may perform transcoding on first-priority multimedia resources, and then perform transcoding on second-priority multimedia resources. When transcoding multimedia resources at the same priority, the server may perform transcoding, in any order, on the multimedia resources at that same priority.

Alternatively, in an embodiment, the server may perform prioritized transcoding on first-priority multimedia resources, and after the view number of second-priority multimedia resources reaches a preset count, transcoding is performed on the multimedia resources reaching the preset count.

In this embodiment of the disclosure, in order to ensure sequential transcoding and improve transcoding efficiency, if there is currently at least one second multimedia resource to be transcoded at the same transcoding priority, the server may rank the first multimedia resource and the at least one second multimedia resource, and then perform transcoding on all the multimedia resources to be transcoded in sequence.

Exemplarily, if the first multimedia resource is at the first priority, and at the first priority, there are other multiple second multimedia resources in addition to the first multimedia resource, the server may rank all the multimedia resources at the first priority, which means ranking the first multimedia resource and the at least one second multimedia resource at the first priority.

In an embodiment, the server may rank the first multimedia resource and the at least one second multimedia resource according to the first parameter value of the first multimedia resource and the size of the first parameter value of the second multimedia resources. The larger the first parameter value is, the higher the priority becomes during ranking. The first multimedia resource and the second multimedia resource which are the same in first parameter value may be ranked based on other parameters of the first multimedia resource and the second multimedia resource, such as the type of the multimedia resources or the uploading time of the multimedia resources.

Exemplarily, when the first parameter value is the same, video-type multimedia resources may be ranked before image-type multimedia resources. Alternatively, when the first parameter value is the same, the multimedia resources uploaded earlier may be ranked at a higher priority.

In an embodiment, the server may rank the first multimedia resource and the at least one second multimedia resource according to the uploading time of the first multimedia resource and the second multimedia resources. The multimedia resources uploaded earlier may be ranked at a higher priority. The first multimedia resource and the second multimedia resource which are the same in uploading time may be ranked based on other parameters of the first multimedia resource and the second multimedia resource, such as the type of the multimedia resources or the first parameter value of the multimedia resources.

Exemplarily, when the uploading time is the same, the video-type multimedia resources may be ranked before the image-type multimedia resources. Alternatively, when the uploading time is the same, the larger the first parameter value is, the higher the priority becomes during ranking.

S505: the first multimedia resource and the second multimedia resources are sequentially subjected to transcoding processing according to the ranking order and the order of the transcoding priority of the first multimedia resource among all transcoding priorities.

In this embodiment of the disclosure, after the server obtains the priorities of all the multimedia resources to be transcoded and ranks the first-priority multimedia resources and the second-priority multimedia resources, the server may sequentially perform transcoding processing on the first multimedia resource and the second multimedia resources according to the ranking order and the order of the transcoding priority of the first multimedia resource among all the transcoding priorities. The higher the position of the transcoding priority in the order, the higher the priority for transcoding the multimedia resources by the server.

In this embodiment, S205 may be correspondingly replaced with S506.

S506: the first multimedia resource and the second multimedia resources are published.

In this embodiment of the disclosure, the server adopts the pre-trained gradient boosting decision tree model to obtain the first parameter value of the first multimedia resource based on the submission features of the submission user. Because the gradient boosting decision tree model is obtained based on the submission features of the different test users, the accuracy of the obtained first parameter value of the first multimedia resource is high, and accordingly, the accuracy of the priority of the first multimedia resource obtained by the server based on the first parameter is higher. In addition, the server may also rank the multimedia resources at the same priority, thereby improving the degree of order of transcoding and improving the transcoding efficiency.

Figure 6:
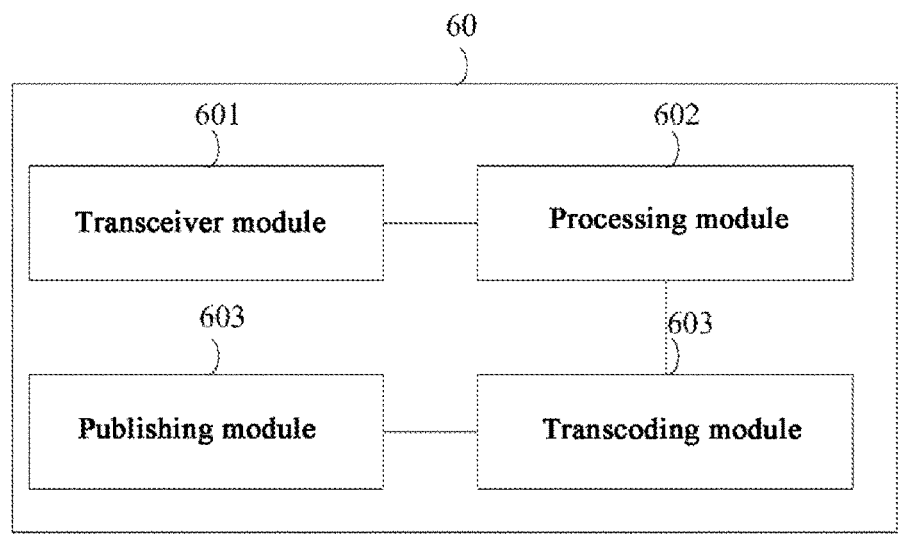
FIG. 6 is a structural block diagram of a multimedia resource processing apparatus according to an embodiment of the disclosure.

Referring to FIG. 6, FIG. 6 is a structural block diagram of a multimedia resource processing apparatus according to an embodiment of the disclosure. To facilitate the description, only the parts related to this embodiment of the disclosure are shown. Referring to FIG. 6, the multimedia resource processing apparatus 60 includes a transceiver module 601, a processing module 602, a transcoding module 603, and a publishing module 604.

The transceiver module 601 receives a first multimedia resource.

The processing module 602 is configured to acquire a transcoding priority of the first multimedia resource according to submission features, the submission features being relevant to the future view number of the first multimedia resource, and the transcoding priority being in positive correlation with the order of transcoding the first multimedia resource among all multimedia resources to be transcoded.

The transcoding module 603 is configured to perform, according to the transcoding priority of the first multimedia resource, transcoding processing on the first multimedia resource before publishing, so as to obtain at least two versions of the first multimedia resource, the different versions of the first multimedia resource being different in encoding format.

The publishing module 604 is configured to publish the at least two versions of the first multimedia resource.

In a possible implementation, the processing module 602 is specifically configured to obtain a first parameter value of the first multimedia resource according to the submission features, the first parameter value being in positive correlation with the cumulative view number of the first multimedia resource within a first preset duration; determine the transcoding priority of the first multimedia resource as a first priority if the first parameter value is greater than or equal to a preset threshold; and determine the transcoding priority of the first multimedia resource as a second priority if the first parameter value is less than the preset threshold, where the transcoding order of the first-priority multimedia resource precedes the transcoding order of the second-priority multimedia resource.

In a possible implementation, the processing module 602 is specifically configured to input the submission features into a pre-trained gradient boosting decision tree model to obtain the first parameter value of the first multimedia resource. The gradient boosting decision tree model is obtained after training based on submission features of different test users.

In a possible implementation, the submission features include submission features of a submission user.

In a possible implementation, the submission features of the submission user include at least one of the following: the total number of users following the submission user, the cumulative view number of multimedia resources of the submission user, the cumulative number of submissions of the submission user, the cumulative number of original multimedia resources submitted by the submission user, and the cumulative number of comments on all the multimedia resources of the submission user.

In a possible implementation, the submission features of the submission user may further include one of the following: the number of new users following the submission user within a second preset duration, the cumulative view number of all the multimedia resources of the submission user within the second preset duration, the cumulative view number of the multimedia resources submitted by the submission user within the second preset duration, the cumulative number of submissions of the submission user within the second preset duration, and the cumulative number of original multimedia resources submitted by the submission user within the second preset duration.

In a possible implementation, the transcoding module 603 is specifically configured to rank the first multimedia resource and at least one second multimedia resource if there is currently at least one second multimedia resource to be transcoded at the same transcoding priority; and sequentially perform transcoding processing on the first multimedia resource and the second multimedia resources according to the ranking order and the order of the transcoding priority of the first multimedia resource among all the transcoding priorities.

In a possible implementation, the transcoding module 603 is specifically configured to rank the first multimedia resource and the at least one second multimedia resource according to the first parameter value of the first multimedia resource and the size of the first parameter value of the second multimedia resources.

In a possible implementation, the transcoding module 603 is specifically configured to rank the first multimedia resource and the at least one second multimedia resource according to the uploading time of the first multimedia resource and the second multimedia resources.

The multimedia resource processing apparatus provided in this embodiment of the disclosure may be used for performing the technical solutions in the above method embodiments, and the implementation principle and technical effects are similar to those as above, which are not further described in this embodiment.

In order to implement the above embodiments, an embodiment of the present disclosure further provides an electronic device.

Figure 7:
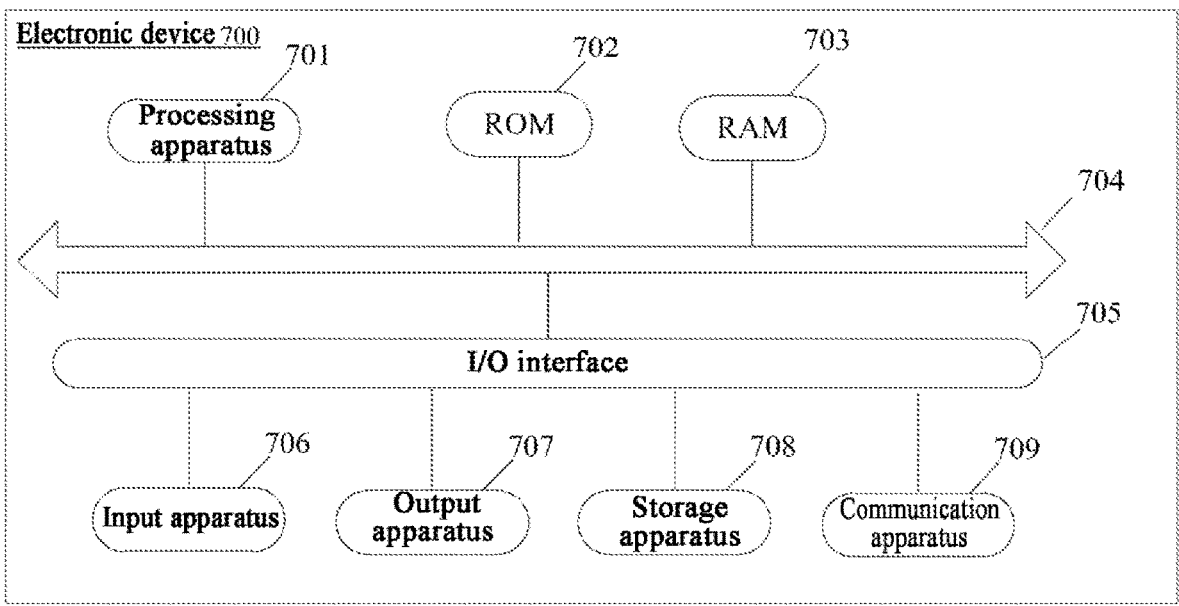
FIG. 7 is a structural schematic diagram of an electronic device according to an embodiment of the disclosure.

Referring to FIG. 7, FIG. 7 illustrates a structural schematic diagram of an electronic device 700 applicable to implementing the embodiments of the disclosure. The electronic device 700 may be the server in the above embodiments. The electronic device shown in FIG. 7 is merely an example, which should not impose any limitations on functions and application ranges of this embodiment of the disclosure.

As shown in FIG. 7, the electronic device 700 may include a processing apparatus (e.g., a central processing unit and a graphics processing unit) 701, which may perform various appropriate actions and processing according to programs stored on a read only memory (ROM) 702 or loaded from a storage apparatus 708 into a random access memory (RAM) 703. The RAM 703 further stores various programs and data required for the operation of the electronic device 700. The processing apparatus 701, the ROM 702, and the RAM 703 are connected to one another through a bus 703. An input/output (I/O) interface 705 is also connected to the bus 703.

Typically, the following apparatuses may be connected to the I/O interface 705: an input apparatus 706, such as a touchscreen, a touchpad, a keyboard, a mouse, a camera, a microphone, an accelerometer, and a gyroscope; an output apparatus 707, such as a liquid crystal display (LCD), a speaker, and a vibrator; the storage apparatus 708, such as a magnetic tape and a hard drive; and a communication apparatus 709. The communication apparatus 709 may allow the electronic device 700 to be in wireless or wired communication with other devices for data exchange. Although FIG. 7 illustrates the electronic device 700 with various apparatuses, it should be understood that it is not necessary to implement or have all the shown apparatuses. Alternatively, more or fewer apparatuses may be implemented or provided.

Particularly, the foregoing process described with reference to the flowchart according to the embodiments of the disclosure may be implemented as a computer software program. For example, an embodiment of the disclosure includes a computer program product including a computer program stored on a computer-readable medium. The computer program includes program code for executing the method shown in the flowchart. In this embodiment, the computer program may be downloaded and installed from the network by the communication apparatus 709, or installed from the storage apparatus 708, or installed from the ROM 702. The computer program, when executed by the processing apparatus 701, performs the above functions limited in the method in this embodiment of the disclosure.

It should be noted that the computer-readable medium in the disclosure may be a computer-readable signal medium, or a computer-readable storage medium, or any combination thereof. The computer-readable storage medium may include but not limited to: electrical, magnetic, optical, electromagnetic, infrared or semiconductor systems, apparatuses or devices, or any combination thereof. More specific examples of the computer-readable storage medium may include but not limited to: an electrical connection with one or more wires, a portable computer disk, a hard drive, a random access memory (RAM), a read only memory (ROM), an erasable programmable read only memory (EPROM or a flash memory), fiber optics, a portable compact disc read only memory (CD-ROM), a light storage device, a magnetic storage device, or any proper combination of the above. In the disclosure, the computer-readable storage medium may be any tangible medium including or storing a program, and the program may be used by an instruction execution system, apparatus or device, or used in conjunction with the instruction execution system, apparatus or device. However, in the disclosure, the computer-readable signal medium may include data signals propagated in a baseband or propagated as a part of a carrier wave, which carry computer-readable program code. The propagated data signals may have a plurality of forms, and include but not limited to electromagnetic signals, optical signals or any proper combination of the above. The computer-readable signal medium may be any computer-readable medium other than the computer-readable storage medium. The computer-readable signal medium may send, propagate or transmit the program used by the instruction execution system, apparatus or device, or used in conjunction with the instruction execution system, apparatus or device. The program code included in the computer-readable medium may be transmitted by any proper medium including but not limited to a wire, an optical cable, radio frequency (RF), etc., or any proper combination of the above.

The computer-readable medium may be included in the electronic device; and may separately exist without being assembled in the electronic device.

The computer-readable medium carries one or more programs. The one or more programs, when executed by the electronic device, enable the electronic device to perform the method shown in the above embodiments.

The computer program code for executing the operations of the disclosure may be written in one or more programming languages or a combination thereof. The programming languages include object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may represent a module, a program segment, or a portion of the code, and the module, program segment, or portion of the code includes one or more executable instructions for implementing specified logical functions. It should be noted that in some alternative implementations, functions marked in the blocks may also occur in an order different from that marked in the accompanying drawings. For example, two consecutively-represented blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The modules described in the embodiments of the disclosure may be implemented through software or hardware. The name of the module does not limit the module in certain cases. For example, a first acquisition unit may also be described as a "module for acquiring at least two Internet protocol addresses."

The functions described above in this specification may be at least partially executed by one or more hardware logic components. For example, exemplary hardware logic components that can be used include but not limited to a field-programmable gate array (FPGA), an application specific integrated circuit (ASIC), application specific standard parts (ASSPs), a system on chip (SOC), a complex programmable logic device (CPLD), etc.

In the context of the disclosure, a machine-readable medium may be a tangible medium that may contain or store a program, and the program may be used by an instruction execution system, apparatus or device, or used in conjunction with the instruction execution system, apparatus or device. The machine-readable medium may be a machine-readable signal medium or a machine-readable storage medium. The machine-readable medium may include but not limited to: electronic, magnetic, optical, electromagnetic, infrared, or semiconductor systems, apparatuses or devices, or any proper combination of the above. More specific examples of the machine-readable storage medium may include: an electrical connection based on one or more wires, a portable computer disk, a hard drive, a random access memory (RAM), a read only memory (ROM), an erasable programmable read only memory (EPROM or a flash memory), fiber optics, a portable compact disc read only memory (CD-ROM), a light storage device, a magnetic storage device, or any proper combination of the above.

In a first aspect, according to one or more embodiments of the disclosure, a multimedia resource processing method is provided and includes: a first multimedia resource is received; submission features are obtained, which are rel-evant to the future view number of the first multimedia resource; the transcoding priority of the first multimedia resource is obtained according to the submission features, and the transcoding priority is in positive correlation with the order of transcoding of the first multimedia resource among all multimedia resources to be transcoded; according to the transcoding priority of the first multimedia resource, the first multimedia resource is transcoded before publishing, so as to obtain at least two versions of the first multimedia resource, and the different versions of the first multimedia resource are different in encoding format; and the at least two versions of the first multimedia resource are published.

According to one or more embodiments of the disclosure, the step of obtaining the transcoding priority of the first multimedia resource according to the submission features includes: a first parameter value of the first multimedia resource is obtained according to the submission features, and the first parameter value is in positive correlation with the cumulative view number of the first multimedia resource within a first preset duration; the transcoding priority of the first multimedia resource is determined as a first priority in response to the first parameter value being greater than or equal to a preset threshold; and the transcoding priority of the first multimedia resource is determined as a second priority in response to the first parameter value being less than the preset threshold, where the transcoding order of the first-priority multimedia resource precedes the transcoding order of the second-priority multimedia resource.

According to one or more embodiments of the disclosure, the step of obtaining a first parameter value of the first multimedia resource according to the submission features includes: the submission features are input into a pre-trained gradient boosting decision tree model to obtain the first parameter value of the first multimedia resource. The gradient boosting decision tree model is obtained after training based on submission features of different users.

According to one or more embodiments of the disclosure, the submission features include submission features of a submission user.

According to one or more embodiments of the disclosure, the submission features of the submission user include at least one of the following: the total number of users following the submission user, the cumulative view number of multimedia resources of the submission user, the cumulative number of submissions of the submission user, the cumulative number of original multimedia resources submitted by the submission user, and the cumulative number of comments on all the multimedia resources of the submission user.

According to one or more embodiments of the disclosure, the submission features of the submission user may further include one of the following: the number of new users following the submission user within a second preset duration, the cumulative view number of all the multimedia resources of the submission user within the second preset duration, the cumulative view number of the multimedia resources submitted by the submission user within the second preset duration, the cumulative number of submissions of the submission user within the second preset duration, and the cumulative number of original multimedia resources submitted by the submission user within the second preset duration.

According to one or more embodiments of the disclosure, the step of performing transcoding processing on the first multimedia resource before publishing according to the transcoding priority of the first multimedia resource includes: if there is currently at least one second multimedia resource to be transcoded at the same transcoding priority, the first multimedia resource and the at least one second multimedia resource are ranked; and transcoding processing is sequentially performed on the first multimedia resource and the second multimedia resources according to the ranking order and the order of the transcoding priority of the first multimedia resource among all the transcoding priorities.

According to one or more embodiments of the disclosure, the step of ranking the first multimedia resource and the at least one second multimedia resource includes: the first multimedia resource and the at least one second multimedia resource are ranked according to the first parameter value of the first multimedia resource and the size of the first parameter value of the second multimedia resources.

According to one or more embodiments of the disclosure, the step of ranking the first multimedia resource and the at least one second multimedia resource includes: the first multimedia resource and the at least one second multimedia resource are ranked according to the uploading time of the first multimedia resource and the second multimedia resources.

In a second aspect, according to one or more embodiments of the disclosure, a multimedia resource processing apparatus is provided, and includes: a transceiver module for receiving a first multimedia resource; a processing module, configured to acquire a transcoding priority of the first multimedia resource according to submission features, the submission features being relevant to the future view number of the first multimedia resource, and the transcoding priority being in positive correlation with the order of transcoding the first multimedia resource among all multimedia resources to be transcoded; a transcoding module, configured to perform, according to the transcoding priority of the first multimedia resource, transcoding processing on the first multimedia resource before publishing, so as to obtain at least two versions of the first multimedia resource, the different versions of the first multimedia resource being different in encoding format; and a publishing module, configured to publish the at least two versions of the first multimedia resource.

According to one or more embodiments of the disclosure, the processing module is specifically configured to obtain a first parameter value of the first multimedia resource according to the submission features, the first parameter value being in positive correlation with the cumulative view number of the first multimedia resource within a first preset duration; determine the transcoding priority of the first multimedia resource as a first priority if the first parameter value is greater than or equal to a preset threshold; and determine the transcoding priority of the first multimedia resource as a second priority if the first parameter value is less than the preset threshold, where the transcoding order of the first-priority multimedia resource precedes the transcoding order of the second-priority multimedia resource.

According to one or more embodiments of the disclosure, the processing module is specifically configured to input the submission features into a pre-trained gradient boosting decision tree model to obtain the first parameter value of the first multimedia resource. The gradient boosting decision tree model is obtained after training based on submission features of different test users.

According to one or more embodiments of the disclosure, the submission features include at least one of the following: submission features of a submission user.

According to one or more embodiments of the disclosure, the submission features of the submission user include at least one of the following: a total number of users following the submission user, a cumulative view number of multimedia resources of the submission user, a cumulative number of submissions of the submission user, a cumulative number of original multimedia resources submitted by the submission user, and a cumulative number of comments on all the multimedia resources of the submission user.

According to one or more embodiments of the disclosure, the submission features of the submission user may further include one of the following: the number of new users following the submission user within a second preset duration, the cumulative view number of all the multimedia resources of the submission user within the second preset duration, the cumulative view number of the multimedia resources submitted by the submission user within the second preset duration, the cumulative number of submissions of the submission user within the second preset duration, and the cumulative number of original multimedia resources submitted by the submission user within the second preset duration.

According to one or more embodiments of the disclosure, the transcoding module is specifically configured to rank the first multimedia resource and at least one second multimedia resource if there is currently at least one second multimedia resource to be transcoded at the same transcoding priority; and sequentially perform transcoding processing on the first multimedia resource and the second multimedia resources according to the ranking order and the order of the transcoding priority of the first multimedia resource among all transcoding priorities.

According to one or more embodiments of the disclosure, the transcoding module is specifically configured to rank the first multimedia resource and the at least one second multimedia resource according to the first parameter value of the first multimedia resource and the size of the first parameter value of the second multimedia resources.

According to one or more embodiments of the disclosure, the transcoding module is specifically configured to rank the first multimedia resource and the at least one second multimedia resource according to the uploading time of the first multimedia resource and the second multimedia resources.

According to one or more embodiments of the disclosure, the multimedia resources are videos.

In a third aspect, according to one or more embodiments of the disclosure, an electronic device is provided, and includes a processor and a memory. The memory stores computer executable instructions. The processor executes the computer executable instructions stored on the memory, such that the processor performs the multimedia resource processing method according to the first aspect and various possible designs in the first aspect.

In a fourth aspect, according to one or more embodiments of the disclosure, a computer-readable storage medium is provided. The computer-readable storage medium stores computer executable instructions. When a processor executes the computer executable instructions, the multimedia resource processing method according to the first aspect and various possible designs in the first aspect is implemented.

In a fifth aspect, according to one or more embodiments of the disclosure, a computer program product is provided and includes computer instructions. The computer instructions, when executed by a processor, implement the multimedia resource processing method according to the first aspect and various possible designs in the first aspect.

In a sixth aspect, an embodiment of the disclosure provides a computer program. The computer program, when executed by a processor, implements the multimedia resource processing method according to the first aspect and various possible designs in the first aspect.

According to the multimedia resource processing method and apparatus, the electronic device, and the readable storage medium provided in the embodiment, the server may predict, based on the submission features, the future view number of the multimedia resources uploaded by the submission user, obtains the transcoding priority based on the future view number of the multimedia resources, and performs prioritized transcoding on the multimedia resource with the high transcoding priority. This embodiment of the disclosure does not adopt a fixed parameter for transcoding the multimedia resources, but predicts, based on the submission features, the future view number of the multimedia resources uploaded by the submission user and the transcoding priority, such that other users can watch the multimedia resources with the high future view number in time, thereby improving transcoding specificity and precision so as to improve user experience.

The names of messages or information exchanged between multiple apparatuses in the implementations of the disclosure are provided for illustrative purposes only, and are not intended to limit the scope of these messages or information.

It should be understood that before using the technical solutions disclosed in the embodiments of the disclosure, based on relevant laws and regulations, users should be informed about the types, application range, scenarios, etc. of personal information involved in the disclosure in a proper manner so as to obtain authorizations of the users.

For example, in response to receiving an active request of the user, a prompt message is sent to the user to clearly indicate the user that it is necessary to obtain and use the personal information of the user for the operation requested to be executed. Therefore, the user may freely select, according to the prompt message, whether to provide the personal information for the software or hardware such as the electronic device, the application, the server, or the storage medium executing the operations of the technical solutions of the disclosure.

As an optional but non-limiting implementation, the manner of sending the prompt message to the user in response to receiving the active request of the user may be, for example, a form of a pop-up window, and the prompt message may be represented within the pop-up window in a text form. Additionally, the pop-up window may further include a selection control for the user to choose whether to "agree" or "disagree" to provide the personal information for the electronic device.

It should be understood that the above description of the notification and user authorization acquisition process is only illustrative, which does not limit the implementations of the disclosure, and other methods that comply with relevant laws and regulations may also be applied to the implementations of the disclosure.

It should be understood that the data (including but not limited to the data itself, and data acquisition, or usage) involved in the technical solutions should comply with the requirements of corresponding laws and regulations, and relevant stipulations.

The above descriptions are merely preferred embodiments of the disclosure and explanations of the applied technical principles. Those skilled in the art should understand that the scope of open in the disclosure is not limited to the technical solutions formed by specific combinations of the above technical features, and also covers other technical solutions formed by arbitrary combinations of the above technical features or equivalent features without departing from the concept of the disclosure, such as a technical solution formed by replacing the above features with the technical features with similar functions disclosed (but not limited to) in the disclosure.

Further, although the operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the disclosure. Certain features described in the context of separate embodiments may also be implemented in combination in a single embodiment. Conversely, various features described in the context of a single embodiment may also be implemented separately or in any suitable sub-combination in a plurality of embodiments.

Although the language specific to structural features and/or method logical actions is adopted to describe this subject, but it should be understood that the subject limited in the appended claims is not necessarily limited to the specific features or actions described above. On the contrary, the specific features and actions described above are merely examples for implementing the claims.

What is claimed is:

1. A multimedia resource processing method, comprising:
receiving a first multimedia resource;
obtaining submission features that are relevant to a future view number of the first multimedia resource;
obtaining a transcoding priority of the first multimedia resource according to the submission features, the transcoding priority being in positive correlation with an order of transcoding of the first multimedia resource among all multimedia resources to be transcoded;
transcoding, according to the transcoding priority of the first multimedia resource, the first multimedia resource before publishing, so as to obtain at least two versions of the first multimedia resource, the at least two versions of the first multimedia resource being different in encoding format, wherein the transcoding, according to the transcoding priority of the first multimedia resource, the first multimedia resource before publishing comprises:
in a case that there is currently at least one second multimedia resource to be transcoded at the same transcoding priority, ranking the first multimedia resource and the at least one second multimedia resource; and
sequentially performing, according to a ranked order and an order of the transcoding priority of the first multimedia resource among all transcoding priorities, transcoding processing on the first multimedia resource and the at least one second multimedia resource; and
publishing the at least two versions of the first multimedia resource.

2. The method according to claim 1, wherein obtaining the transcoding priority of the first multimedia resource according to the submission features comprises:
obtaining, according to the submission features, a first parameter value of the first multimedia resource, the first parameter value being in positive correlation with a cumulative view number of the first multimedia resource within a first preset duration;

determining the transcoding priority of the first multimedia resource as a first priority in response to the first parameter value being greater than or equal to a preset threshold; and determining the transcoding priority of the first multimedia resource as a second priority in response to the first parameter value being less than the preset threshold, wherein the transcoding order of the first-priority multimedia resource precedes the transcoding order of the second-priority multimedia resource.

3. The method according to claim 2, wherein the obtaining, according to the submission features, a first parameter value of the first multimedia resource comprises:

inputting the submission features into a pre-trained gradient boosting decision tree model to obtain the first parameter value of the first multimedia resource, the gradient boosting decision tree model being obtained by training based on submission features of different test users.

4. The method according to claim 1, wherein the submission features comprise submission features of a submission user.

5. The method according to claim 4, wherein the submission features comprise at least one of the following:

a total number of users following the submission user, a cumulative view number of multimedia resources of the submission user, a cumulative number of submissions of the submission user, a cumulative number of original multimedia resources submitted by the submission user, and a cumulative number of comments on all the multimedia resources of the submission user.

6. The method according to claim 4, wherein the submission features comprise at least one of the following:

a number of new users following the submission user within a second preset duration, a cumulative view number of all the multimedia resources of the submission user within the second preset duration, a cumulative view number of the multimedia resources submitted by the submission user within the second preset duration, a cumulative number of submissions of the submission user within the second preset duration, and a cumulative number of original multimedia resources submitted by the submission user within the second preset duration.

7. The method according to claim 2, wherein ranking the first multimedia resource and the at least one second multimedia resource comprises:

ranking the first multimedia resource and the at least one second multimedia resource according to the first parameter value of the first multimedia resource and a size of the first parameter value of the at least one second multimedia resource.

8. The method according to claim 2, wherein ranking the first multimedia resource and the at least one second multimedia resource comprises:

ranking the first multimedia resource and the at least one second multimedia resource according to uploading time of the first multimedia resource and the at least one second multimedia resource.

9. An electronic device, comprising: at least one processor and a memory, wherein the memory stores computer executable instructions, and the computer executable instructions stored on the memory, when executed by the at least one processor, cause the electronic device to:

receive a first multimedia resource;

obtain submission features that are relevant to a future view number of the first multimedia resource;

obtain a transcoding priority of the first multimedia resource according to the submission features, the transcoding priority being in positive correlation with an order of transcoding of the first multimedia resource among all multimedia resources to be transcoded;

transcode, according to the transcoding priority of the first multimedia resource, the first multimedia resource before publishing, so as to obtain at least two versions of the first multimedia resource, the at least two versions of the first multimedia resource being different in encoding format, wherein the computer executable instructions causing the electronic device to transcode, according to the transcoding priority of the first multimedia resource, the first multimedia resource before publishing further cause the electronic device to:

in a case that there is currently at least one second multimedia resource to be transcoded at the same transcoding priority, rank the first multimedia resource and the at least one second multimedia resource; and sequentially perform, according to a ranked order and an order of the transcoding priority of the first multimedia resource among all transcoding priorities, transcode processing on the first multimedia resource and the at least one second multimedia resource; and publish the at least two versions of the first multimedia resource.

10. A non-transitory computer-readable storage medium, wherein the computer-readable storage medium stores computer executable instructions which, when executed by a processor, cause the processor to:

receive a first multimedia resource;

obtain submission features that are relevant to a future view number of the first multimedia resource;

obtain a transcoding priority of the first multimedia resource according to the submission features, the transcoding priority being in positive correlation with an order of transcoding of the first multimedia resource among all multimedia resources to be transcoded;

transcode, according to the transcoding priority of the first multimedia resource, the first multimedia resource before publishing, so as to obtain at least two versions of the first multimedia resource, the different at least two versions of the first multimedia resource being different in encoding format, wherein the computer executable instructions causing the processor to transcode, according to the transcoding priority of the first multimedia resource, the first multimedia resource before publishing further cause the processor to:

in a case that there is currently at least one second multimedia resource to be transcoded at the same transcoding priority, rank the first multimedia resource and the at least one second multimedia resource; and sequentially perform, according to a ranked order and an order of the transcoding priority of the first multimedia resource among all transcoding priorities, transcode processing on the first multimedia resource and the at least one second multimedia resource; and publish the at least two versions of the first multimedia resource.

11. The electronic device according to claim 9, wherein the computer executable instructions causing the electronic device to obtain the transcoding priority of the first multimedia resource according to the submission features further cause the electronic device to:

obtain, according to the submission features, a first parameter value of the first multimedia resource, the first parameter value being in positive correlation with a cumulative view number of the first multimedia resource within a first preset duration;

determine the transcoding priority of the first multimedia resource as a first priority in response to the first parameter value being greater than or equal to a preset threshold; and determine the transcoding priority of the first multimedia resource as a second priority in response to the first parameter value being less than the preset threshold, wherein the transcoding order of the first-priority multimedia resource precedes the transcoding order of the second-priority multimedia resource.

12. The electronic device according to claim 11, wherein the computer executable instructions causing the electronic device to obtain, according to the submission features, a first parameter value of the first multimedia resource further cause the electronic device to:

input the submission features into a pre-trained gradient boosting decision tree model to obtain the first parameter value of the first multimedia resource, the gradient boosting decision tree model being obtained by training based on submission features of different test users.

13. The electronic device according to claim 9, wherein the submission features comprise submission features of a submission user.

14. The electronic device according to claim 13, wherein the submission features comprise at least one of the following:

a total number of users following the submission user, a cumulative view number of multimedia resources of the submission user, a cumulative number of submissions of the submission user, a cumulative number of original multimedia resources submitted by the submission user, and a cumulative number of comments on all the multimedia resources of the submission user.

15. The electronic device according to claim 13, wherein the submission features comprise at least one of the following:

a number of new users following the submission user within a second preset duration, a cumulative view number of all the multimedia resources of the submission user within the second preset duration, a cumulative view number of the multimedia resources submitted by the submission user within the second preset duration, a cumulative number of submissions of the submission user within the second preset duration, and a cumulative number of original multimedia resources submitted by the submission user within the second preset duration.

16. The electronic device according to claim 11, wherein the computer executable instructions causing the electronic device to rank the first multimedia resource and the at least one second multimedia resource comprises further cause the electronic device to:

rank the first multimedia resource and the at least one second multimedia resource according to the first parameter value of the first multimedia resource and a size of the first parameter value of the at least one second multimedia resource.

17. The electronic device according to claim 11, wherein the computer executable instructions causing the electronic device to rank the first multimedia resource and the at least one second multimedia resource-comprises further cause the electronic device to:

rank the first multimedia resource and the at least one second multimedia resource according to uploading time of the first multimedia resource and the at least one second multimedia resource.

18. The non-transitory computer-readable storage medium according to claim 10, wherein the computer executable instructions causing the processor to obtain the transcoding priority of the first multimedia resource according to the submission features further cause the processor to:

obtain, according to the submission features, a first parameter value of the first multimedia resource, the first parameter value being in positive correlation with a cumulative view number of the first multimedia resource within a first preset duration;

determine the transcoding priority of the first multimedia resource as a first priority in response to the first parameter value being greater than or equal to a preset threshold; and determine the transcoding priority of the first multimedia resource as a second priority in response to the first parameter value being less than the preset threshold, wherein the transcoding order of the first-priority multimedia resource precedes the transcoding order of the second-priority multimedia resource.

* * * * *